United States Patent
Bhargava et al.

(10) Patent No.: US 10,035,079 B2
(45) Date of Patent: *Jul. 31, 2018

(54) DISTILLATION SYSTEM FOR REDUCING ENERGY CONSUMPTION BY THERMAL COUPLING

(71) Applicant: GTC Technology US LLC, Houston, TX (US)

(72) Inventors: Manish Bhargava, Katy, TX (US); Ashraf Lakha, Stoke-on-Trent (GB); Sachin Joshi, Katy, TX (US); TingTing Kok, Singapore (SG)

(73) Assignee: GTC Technology US LLC, Houston, TX (US)

( * ) Notice: Subject to any disclaimer, the term of this patent is extended or adjusted under 35 U.S.C. 154(b) by 740 days.

This patent is subject to a terminal disclaimer.

(21) Appl. No.: 13/830,245

(22) Filed: Mar. 14, 2013

(65) Prior Publication Data

US 2014/0224637 A1    Aug. 14, 2014

Related U.S. Application Data

(60) Provisional application No. 61/763,326, filed on Feb. 11, 2013.

(51) Int. Cl.
   *B01D 3/00* (2006.01)

(52) U.S. Cl.
   CPC .................. *B01D 3/007* (2013.01)

(58) Field of Classification Search
   USPC .................. 560/330, 352; 422/608, 600
   See application file for complete search history.

(56) References Cited

U.S. PATENT DOCUMENTS

| | | | | |
|---|---|---|---|---|
| 2,528,892 | A * | 11/1950 | Lien et al. | 585/800 |
| 3,584,068 | A * | 6/1971 | Jackson et al. | 585/478 |
| 3,725,211 | A * | 4/1973 | Gehrken et al. | 203/74 |
| 4,673,490 | A | 6/1987 | Subramanian et al. | |
| 4,824,527 | A * | 4/1989 | Erickson | 203/25 |
| 5,346,593 | A * | 9/1994 | Cialkowski et al. | 203/18 |
| 5,565,068 | A | 10/1996 | Parker et al. | |
| 6,171,449 | B1 * | 1/2001 | Welch | 202/154 |
| 6,479,720 | B1 * | 11/2002 | O'Brien et al. | 585/448 |
| 6,803,483 | B2 * | 10/2004 | Lokum et al. | 560/347 |
| 6,846,389 | B2 * | 1/2005 | Kaibel et al. | 203/1 |
| 7,118,653 | B2 * | 10/2006 | Brady et al. | 203/29 |
| 7,267,746 | B1 * | 9/2007 | Harris et al. | 202/160 |
| 7,897,829 | B2 * | 3/2011 | Glover et al. | 585/827 |
| 8,901,346 | B2 * | 12/2014 | Merenov et al. | 560/352 |
| 9,000,237 | B2 * | 4/2015 | Powell | 568/913 |
| 2006/0101852 | A1 | 5/2006 | Porter | |

* cited by examiner

*Primary Examiner* — Chester T Barry
(74) *Attorney, Agent, or Firm* — Winstead PC

(57) ABSTRACT

The claimed invention relates to a method for reducing energy consumption in a distillation process by using thermal coupling. Embodiments of the claimed invention are directed to the inclusion of a side reboiler and a partial condenser in the prefractionation section of a first column, which in turn helps to uniformly distribute the vapor liquid traffic between a first column and a second column.

6 Claims, 2 Drawing Sheets

DISTILLATION SYSTEM FOR REDUCING ENERGY CONSUMPTION BY THERMAL COUPLING

CROSS-REFERENCES TO RELATED APPLICATIONS

This Application claims the benefit under 35 U.S.C. § 119(e) of U.S. Provisional Patent Application Ser. No. 61/763,326 filed Feb. 11, 2013, which is incorporated herein by reference in its entirety as if fully set forth herein.

FIELD OF THE INVENTION

The claimed invention relates to a method for reducing energy consumption in a distillation process by using thermal coupling. Embodiments of the claimed invention are directed to the inclusion of a side reboiler and a partial condenser in the prefractionation section of a first column, which in turn helps to uniformly distribute the vapor liquid traffic between a first column and a second column.

BACKGROUND OF THE INVENTION

Distillation is the most common separation process used in the chemical, petrochemical, refining and related process industries. It consumes a large amount of energy due to the heating and cooling steps involved through the reboiler and condenser respectively. The major cost overhead for the process industries comes from operating costs which includes raw materials cost, energy cost and labor cost. It would be desirable to reduce the energy cost in the interest of economy as well as society.

There are complex distillation configurations available which offer substantial reduction in energy and capital expenditures. These options include, but are not limited to, dividing wall columns and thermally coupled columns.

Although thermally coupled columns require 20-30% less energy, they have serious drawbacks that make them ineffective for commercial installations. For example, thermally coupled arrangements are realized by setting up two-way vapor/liquid flow between different columns of a distillation sequence. One of the drawbacks of thermal coupling is non-uniform vapor liquid traffic in the column. As shown in FIG. 1, the top and bottom section of the column sees heavy vapor liquid traffic, whereas in prefractionation and main section, of the column the traffic is low. The heavy traffic puts a restriction on column capacity and in many cases existing column shells cannot be utilized.

There is therefore a need to develop and implement a thermal coupling system that has superior energy conservation properties, while at the same time having a uniform vapor liquid traffic in the column.

SUMMARY OF THE INVENTION

An embodiment of the invention is directed to a distillation system comprising a first distillation column and a second distillation column wherein said system is used to separate benzene, toluene and xylenes via thermal coupling. In an embodiment of the invention, the prefractionation section of a first distillation column includes a partial condenser and a side reboiler.

In an embodiment of the invention, the benefits of the thermal coupling scheme of claimed invention is used in a benzene-toluene distillation sequence.

DETAILED DESCRIPTION OF EXEMPLARY EMBODIMENTS

An embodiment of the invention is directed to a distillation system comprising a first distillation column and a second distillation column wherein said system is used to separate benzene, toluene and xylenes via thermal coupling. In an embodiment of the invention, the prefractionation section of the first distillation column includes a partial condenser.

In certain embodiments of the invention, the partial condenser has a high condensing temperature and can generate low pressure (LLP) steam. In an embodiment of the invention, the partial condenser offers steam generating capability in the prefractionation section overhead. This overhead vapor serves as the feed for the top section of the second distillation column.

In certain embodiments of the invention, a side reboiler is connected to the prefractionation section of the first distillation column. In certain embodiments of the invention, the prefractionation section of the first distillation column has a vapor side draw. This vapor side draw serves as the feed to the main section of the second distillation column.

In an embodiment of the invention, the main section of the second distillation column comprises a reboiler. In certain embodiments, this reboiler is a waste heat recovery reboiler. The reboiler of the main section of the second distillation column runs on low temperature heat. The reboiler reduces the overall steam consumption and can run on flash steam recovered from steam condensates.

In certain embodiments of the invention, the vapor side draw of the prefractionation section of the first distillation column also feeds into the reboiler of the main section of the second distillation column. Thus, the reboiler stabilizes the operation of the second distillation column by absorbing any fluctuations of vapor feed flow from the first distillation column.

In an embodiment of the invention, the addition of use of a side reboiler and a partial condenser in the prefractionation section helps in uniformly distributing the vapor liquid traffic in the two columns. Additionally, the addition of the side reboiler and the partial condenser increases plant capacity and reduces energy consumption.

In an embodiment of the invention, the benefits of the thermal coupling scheme of claimed invention is used in a benzene-toluene distillation sequence.

Figure 1:
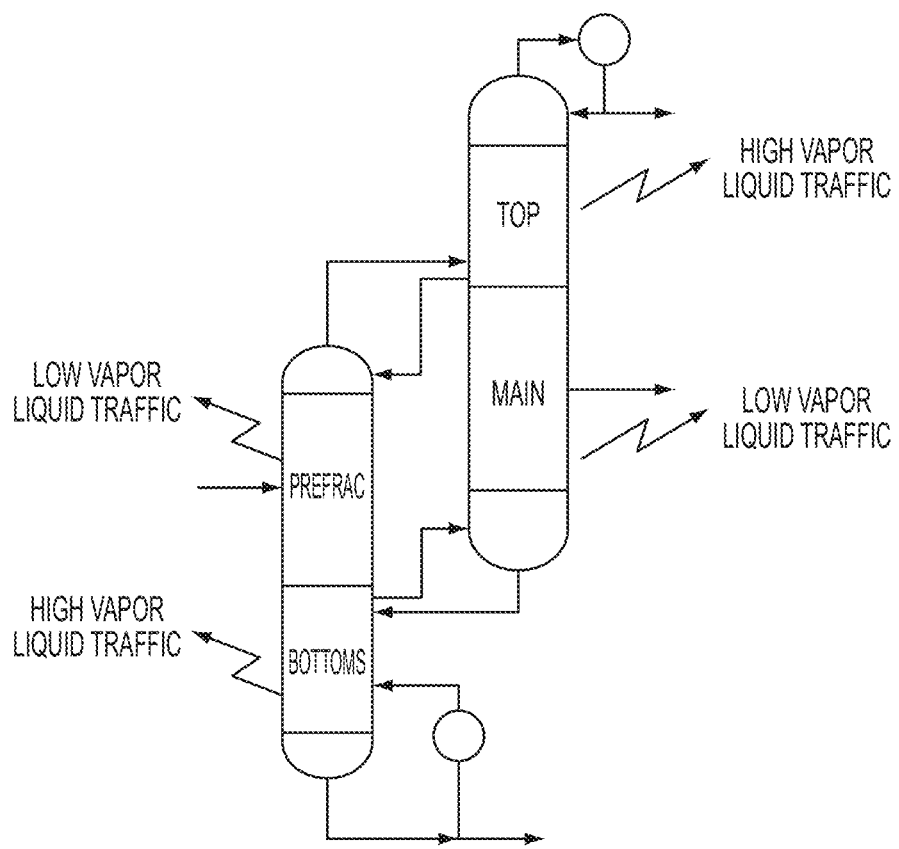
FIG. 1 is directed to a prior art process and system for distillation.
Figure 2:
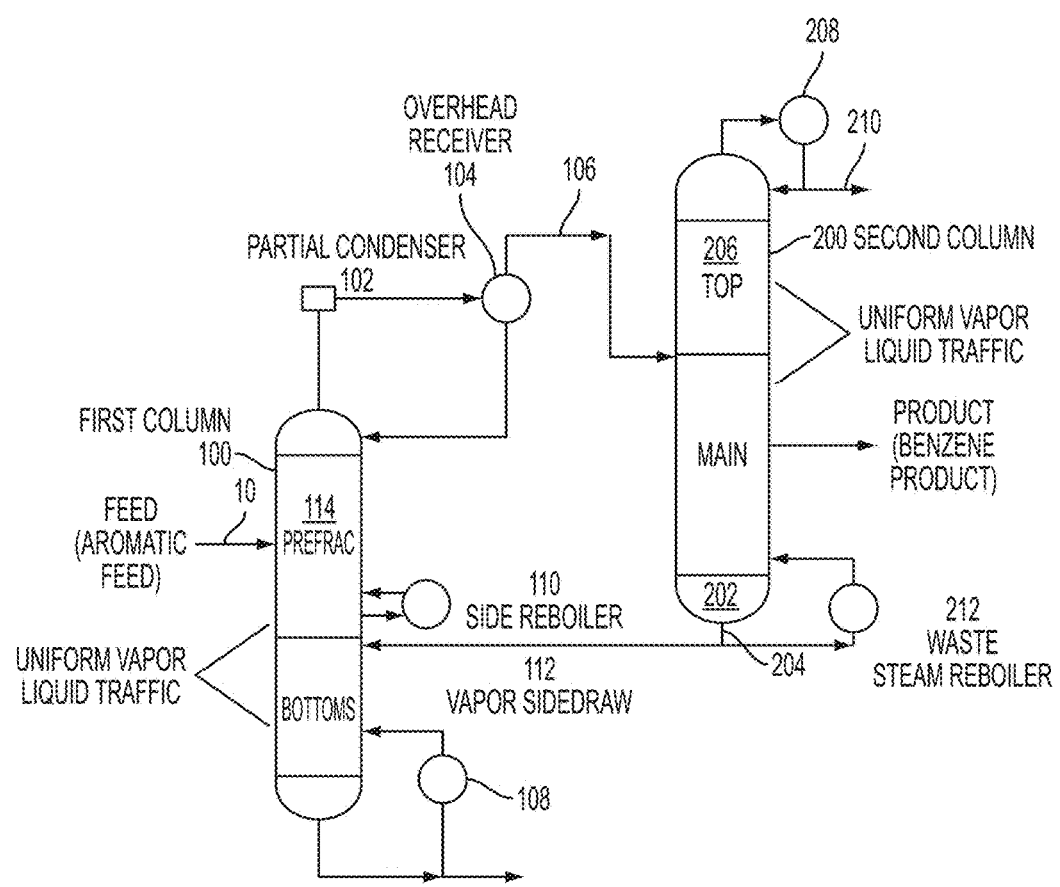
FIG. 2 shows a thermal process in accordance with an embodiment of the invention.

As set forth in FIG. 2, an aromatics feed 10 is flow controlled and is sent to a first column 100 that is designated in certain embodiments as a toluene column. The first column 100 includes overhead vapors that are partially condensed in a partial condenser 102. A condensed liquid is collected in a first column overhead receiver 104. The overhead condensed liquid from the first column overhead receiver 104 is sent back to the first column 100 as reflux. An uncondensed vapor stream 106 from the overhead receiver is sent to a second column 200 that is designated in certain embodiments as a benzene column. Thus, the first column overhead pressure floats on the second column pressure.

In certain embodiments of the invention, the first column 100 includes a bottoms reboiler 108. In certain embodiments, the bottoms reboiler 108 is a steam reboiler that uses steam as a heating medium. A heat input to the bottoms reboiler 108 of the first column is regulated by controlling steam/condensate flow cascaded to a bottom tray temperature of the first column. Thus, a bottom temperature of the first column 100 is controlled.

In certain embodiments of the invention, a first column side reboiler 110 is a steam reboiler that uses a steam heating medium. A heat input to the first column side reboiler 110 is regulated by controlling a flow of condensate.

In an embodiment of the invention, a thermal coupling effect in the first column 100 is generated by interaction between 3 streams:

a. A vapor side draw 112 from a prefractionation section 114 of the first column is sent to a bottom section 202 of the second column 200. The vapor side draw 112 stream is flow controlled.

b. A bottoms liquid 204 from the second column 200 is sent back to the prefractionation section 114 of the first column 100. The bottoms liquid 204 stream is flow controlled cascaded to level control bottoms of the second column 200.

c. The overhead vapor from the first column overhead receiver 104 is sent to a top section 206 of the second column 200.

In an embodiment of the invention, the second column 200 is provided with two feed streams. The first feed stream is the vapor stream from the overhead receiver 104 of the first column 100. The second feed stream to the second column is the vapor stream from the prefractionation section 114 of the first distillation column 100. A pressure of the second column 200 is maintained by controlling a pressure of second column overhead receiver 208. The liquid from the second column overhead receiver 208 is sent back to the top section 206 of the second column 200 as reflux. This stream is flow controlled cascaded to the level control of second column overhead receiver 208.

In certain embodiments of the invention, a highly pure benzene product is drawn off as a liquid side draw 210 near the top section 206 of the second column 200. The benzene product purity is maintained by controlling the flow of benzene product cascaded to a differential temperature controller between two trays in the top section 206 of the second column 200.

In certain embodiments of the invention, a highly pure toluene product is drawn off as a liquid side draw of the second column 200 near the bottom section 202 of the second column 200. The toluene product purity is maintained by controlling a flow of the toluene product cascaded to a temperature controller to maintain the temperature of a tray near a bottom tray of the second column 200.

In certain embodiment of the invention, a duty of a second column reboiler 212 is controlled by controlling a flow of the heating medium to the second column reboiler 212.

Overall aspects of the invention relate to methods for increasing the energy efficiency of a distillation process using a thermal coupling process. Those having skill in the art, with the knowledge gained from the present disclosure, will recognize that various changes could be made to the methods disclosed herein without departing from the scope of the present invention. Mechanisms used to explain theoretical or observed phenomena or results, shall be interpreted as illustrative only and not limiting in any way the scope of the appended claims.

What is claimed is:

1. A distillation system comprising:
    a first distillation column and a second distillation column;
    a first overhead receiver in fluid communication with the first distillation column and the second distillation column;
    a vapor side-draw feed in fluid communication with a prefractionation section of the first distillation column and a bottoms section and a reboiler of the second distillation column.

2. The distillation system of claim 1, wherein the prefractionation section of the first distillation column is in fluid communication with a partial condenser.

3. The distillation system of claim 1, further comprising a side reboiler in fluid communication with the prefractionation section of the first distillation column.

4. The distillation system of claim 1, wherein the reboiler of the second distillation column is in fluid communication with a main section of the second distillation column, and wherein the reboiler of the second distillation column runs on low temperature heat.

5. The distillation system of claim 2, wherein the overhead receiver comprises a first outlet that feeds condensed liquid back to the first distillation column, and further comprises a second outlet that feeds uncondensed vapors to the second distillation column.

6. The distillation system of claim 1, further comprising a second overhead receiver in fluid communication with the second distillation column, and wherein a liquid benzene product is drawn off near a top of the second column as a liquid side draw.

\* \* \* \* \*